April 26, 1966 J. W. RIDLEY 3,247,641
APPARATUS FOR ASSEMBLING AND FILLING CARTRIDGE-NEEDLE UNITS
Filed Feb. 28, 1963 10 Sheets-Sheet 1

FIG.I.

INVENTOR
JOHN W. RIDLEY
BY
Andrew Kafro
ATTORNEY

April 26, 1966 J. W. RIDLEY 3,247,641
APPARATUS FOR ASSEMBLING AND FILLING CARTRIDGE-NEEDLE UNITS
Filed Feb. 28, 1963 10 Sheets-Sheet 2
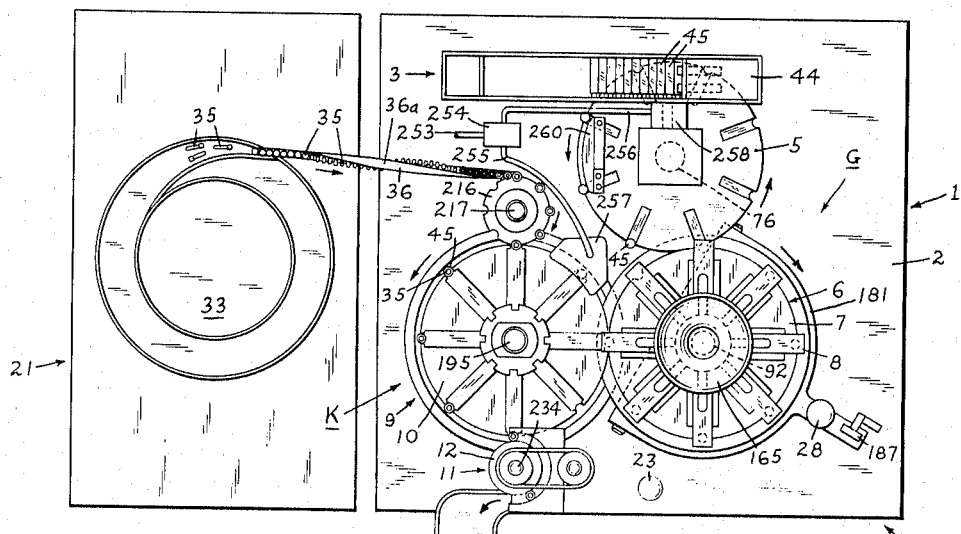
FIG. 2.
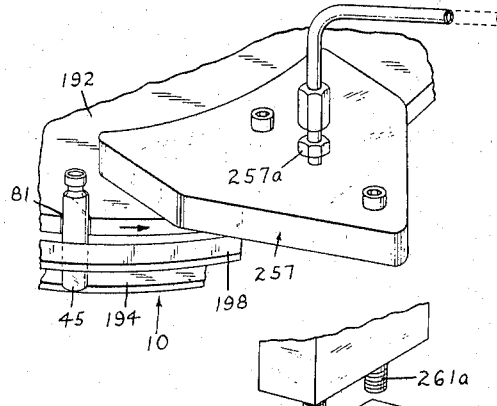
FIG. 15.
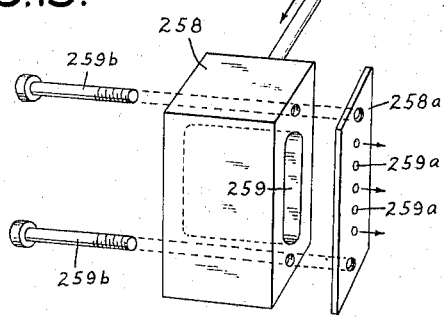
FIG. 14.
FIG. 16.
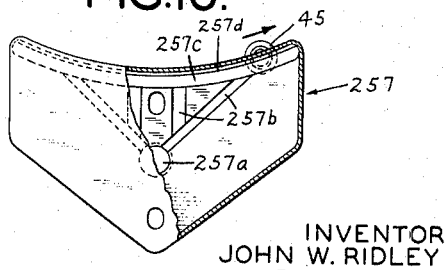
INVENTOR
JOHN W. RIDLEY
BY
Andrew Kafro
ATTORNEY April 26, 1966  J. W. RIDLEY  3,247,641
APPARATUS FOR ASSEMBLING AND FILLING CARTRIDGE-NEEDLE UNITS
Filed Feb. 28, 1963  10 Sheets-Sheet 4

INVENTOR
JOHN W. RIDLEY
BY
ATTORNEY

April 26, 1966   J. W. RIDLEY   3,247,641
APPARATUS FOR ASSEMBLING AND FILLING CARTRIDGE-NEEDLE UNITS
Filed Feb. 28, 1963   10 Sheets-Sheet 5

INVENTOR
JOHN W. RIDLEY
BY
Andrew Kafuo
ATTORNEY

April 26, 1966     J. W. RIDLEY     3,247,641
APPARATUS FOR ASSEMBLING AND FILLING CARTRIDGE-NEEDLE UNITS
Filed Feb. 28, 1963     10 Sheets-Sheet 7

INVENTOR
JOHN W. RIDLEY
BY
Andrew Kafko
ATTORNEY

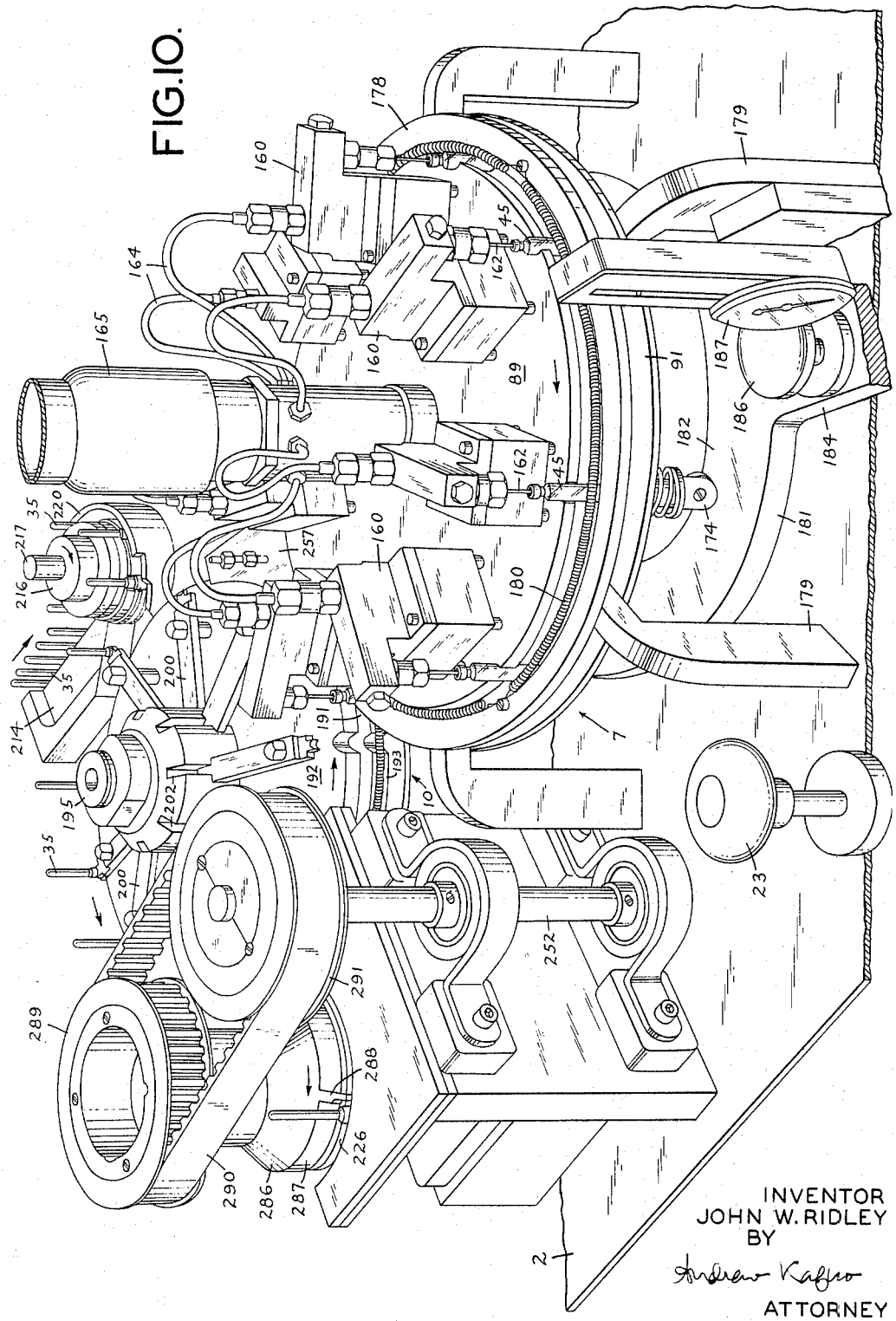

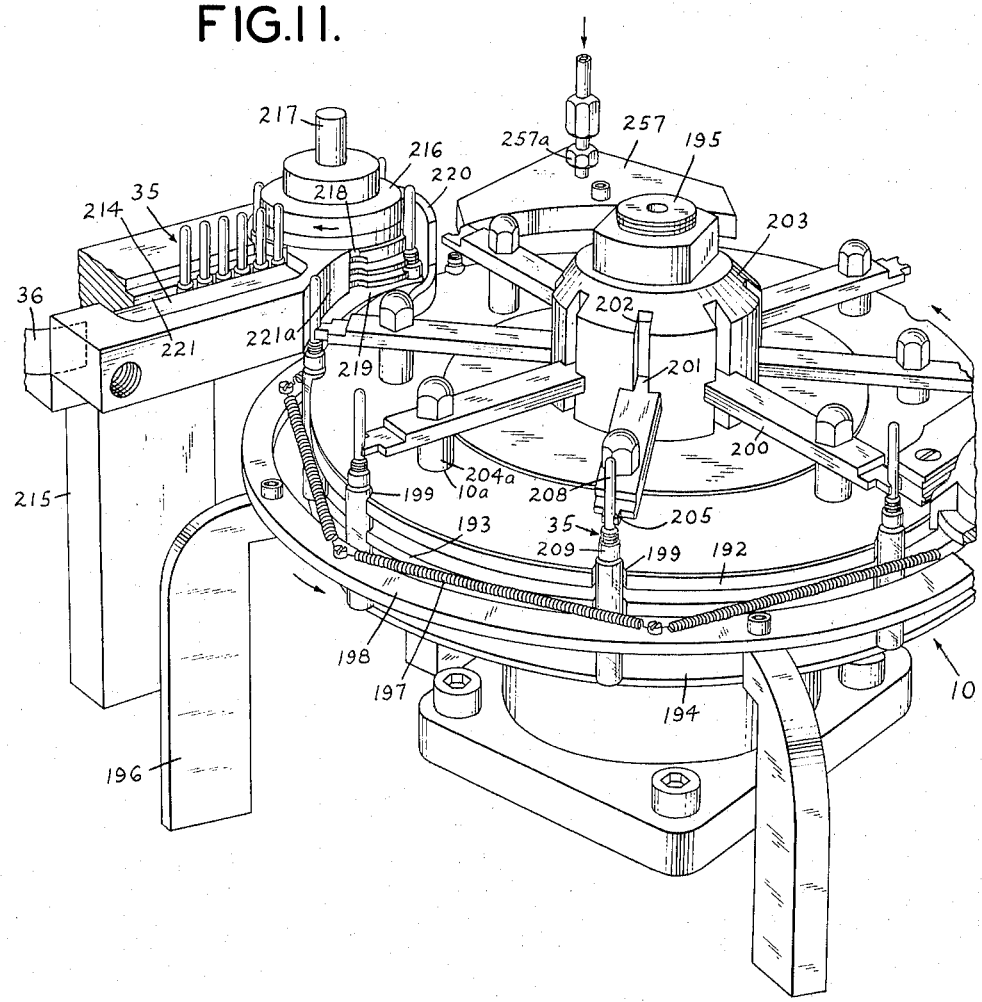

April 26, 1966  J. W. RIDLEY  3,247,641
APPARATUS FOR ASSEMBLING AND FILLING CARTRIDGE-NEEDLE UNITS
Filed Feb. 28, 1963  10 Sheets-Sheet 10

INVENTOR
JOHN W. RIDLEY
BY
ATTORNEY 3,247,641
APPARATUS FOR ASSEMBLING AND FILLING CARTRIDGE-NEEDLE UNITS
John W. Ridley, Delaware, Pa., assignor to American Home Products Corporation, New York, N.Y., a corporation of Delaware
Filed Feb. 28, 1963, Ser. No. 261,682
11 Claims. (Cl. 53—67)

This invention relates generally to the production of cartridge-needle units, and to the optional filling of such units as an integral part of said production. More particularly, the invention pertains to a process and apparatus for assembling such units, which when assembled and filled either during or subsequent to assembly, are usable in suitable syringes for parenteral administering of therapeutic drugs.

The assembled cartridge-needle units to which the present invention pertains usually comprise a glass tube, one end of which is closed by a slideable plunger, and the other end of which is provided with a flange around its opening. Said other end is closed by a stopper, through which extends a hollow injection needle. Conventionally, in this type of cartridge-needle unit, the needle is secured to the tube by crimping a portion of a hub in which the needle is fixedly mounted, around the flange of the tube, to complete the assembly. Optionally, a metered amount of an injectable drug may be charged to the open flanged end of the tube prior to the closing thereof as by crimping the needle-carrying hub thereto.

Ordinarily, the separate element of the final cartridge-needle units are provided for assembly as follows:

The glass tubes with slideable plungers in place are supplied in washed and sterile condition stacked on end in trays with the open ends oriented in one direction. The injection needles are furnished in clean sterile condition fixedly mounted in hubs having a depending crimpable skirt and an elastic closure such as a stopper or washer in place within the hub skirt. The hollow needles as furnished are preferably protected by a removable rubber or rubber-like sheath which also functions to complete the hermetic sealing of the units after final assembly. The particular injectable drug with which the units are to be filled is supplied in bulk in sterile condition. As already indicated, the filling step may be omitted during assembly when it is desired to produce sterile empty units for certain purposes, such as where the doctor is to fill the unit with the therapeutic substance prior to use. It is obvious that, due to the nature of use of the final cartridge-needle unit, all assembly operations require to be carried out aseptically.

In consideration of the foregoing, it is a primary object of the present invention to provide a process and apparatus for assembling cartridge-needle units of the type described by a highly efficient and substantially fully automatic operation.

Another object of the invention is to provide a process and apparatus for assembling cartridge-needle units that employ a continuous series of operations as the units move continuously from the point at which the separate elements of the units are loaded to the machine through the discharge of the finally assembled, and in some instances, the filled cartridge-needle units.

Another object is to provide apparatus of the type referred to above wherein the arrangement of the structure performing all of the aforesaid functions permits them to be done in a highly efficient manner and yet occupies a minimum amount of space.

A further object of the invention is to provide, in apparatus of the type described, automatically operable tube-filling means comprising an array of separate pumps mounted on a movable support, each pump being operable in response to movement of the support carrying said pumps.

Another object is to provide in such apparatus an array of needle-hub assembly applying means mounted on a movable support and operable in response to movement of said support.

Yet another object is to provide continuously operating crimping means for permanently joining a needle-hub assembly to a tube as the tube is caused to rotate on its vertical axis while it moves laterally through said crimping means.

Another object is to provide means for automatically clearing said continuously operating crimping means whenever the latter does not function properly.

Still another object of the invention is to provide automatic shut-down means for the entire apparatus, which means are actuated whenever a location in the movable support of the tube-alining means does not contain a tube to be filled.

Another object is to provide automatic means for arresting feeding operation to the needle-hub assembly-applying means whenever a location in the movable support of the latter does not contain a tube to be covered by a needle-hub assembly.

Another object is to provide gas flushing means for the tubes being assembled by the machine, which means are operable both prior to and after the filling of the tubes.

The above, and other objects and advantages of the invention, will appear from the description thereof below.

*General description of the process*

The operation of this invention involves the following features. The empty tubes in alined vertical position, open ends up and with the slideable plungers sealing the lower ends thereof, are transported continuously from an alining station. When a filling operation is to be included, the empty tubes are transported continuously from the alining station to a filling station. At the latter station, each tube is brought into alinement with the delivery nozzle of a metering pump while being continuously moved through the filling station, the pump being moved to follow the movement of the tube. While tube and pump are in alinement, the pump is operated to inject a metered amount of injectable drug into the tube, the operation of the pump being automatically controlled by its movement in following the tube. From the filling station or directly from the alining station, if the filling station is omitted entirely, the tubes are continuously moved to and through a needle assembly applying station at which a sheathed needle mounted in a metal hub provided with an interior elastic closure is placed on the open flanged end of each tube, with the crimpable skirt of the needle-hub surrounding the end flange of the tube. From the needle-hub applying station the tubes with mounted needles are continuously transported to and through a crimping station in which the crimpable skirts of the hubs are crimped around the end flanges of the tubes. This crimping serves to secure the hubs and the sheathed needles therewith in place on the tubes and, by applying pressure to the elastic closure, to close the unit leak-tight. From the crimping station the finished cartridge-needle units are discharged continuously into any suitable receptacle.

It is an outstanding advantage of the series of steps described and of the apparatus by which they are carried out that the glass tubes, throughout the alining, filling, needle-applying and crimping steps, are moved continuously, thus avoiding the inefficiencies of intermittent motion, viz. waste of power in overcoming the inertia of stopping and starting, loss of time, machine complication, unnecessary noise, high maintenance, and the like.

*General description of the apparatus*

While a detailed description of a preferred embodiment of this invention is given below, it will aid in the understanding of the operation first to describe in a more general way the major machine features involved.

The continuous transport of the tubes from station to station is effected by three horizontal rotating discs or circular tables with provision for removably securing the tubes in upright position sequentially to the respective peripheries of said discs at equispaced locations thereon. The first disc is rotated in a position of near tangency to the second disc and the second to the third. Means are provided for loading alined tubes on the first disc, for transferring tubes from the first to the second and the second to the third disc, and for removing tubes from the third disc.

For the filling operation, when included, an assembly of metering pumps is mounted on and rotates with the second disc, each pump having a discharge nozzle over a tube location on the periphery of the disc. An adjustable cam underlying the disc is arranged to activate each of the pumps at an appropriate period in the rotation of the disc to fill each tube in turn with the desired amount of drug. All the pumps are connected with a supply of the drug which may be held in a container rotating with the pumps or in a fixed container connected with the pumps through a suitable swivel union.

The filled tubes are transferred from the second disc to the third disc, during the rotation of which they are moved past a needle-indexing wheel from which a needle and hub assembly enclosing an elastic closure is placed on each tube by needle and hub applying means mounted on and rotating with the disc. A needle and hub assembly is placed upon each tube and pressed down so that the hub skirt surrounds the flange circumscribing the tube opening and the elastic closure within the skirt is applied to the tube opening.

It will thus be seen that the three discs with associated auxiliaries constitute respectively the alining, filling and needle-applying stations to and through which the tubes are continuously moved. The rotations of the discs are synchronized by suitable gearing so that the tubes pass smoothly and continuously from disc to disc.

Adjacent the third disc, at a point in its periphery at which the tubes carried by it already have mounted on their open upper ends the applied needle-hub assembly, there is mounted a crimping station. Means are provided at this point to transfer tubes from the third disc to the crimping station. The latter comprises a crimping roller or pulley of a relatively thin vertical dimension which rotates within a fixed member having an arcuate edge conforming to but spaced from the periphery of the crimping roller. The channel between the crimping roller and the fixed member and the conformation of their opposed edges is such as to receive a needle hub. The peripheral speed of the crimping roller is greater than that of the third disc so that a hub (with, of course, the whole cartridge-needle unit) entering the channel is rolled along the fixed edge of the channel and the crimpable skirt of the hub is crimped around the tube flange. This secures the needle to the tube with a firm leak-proof joint and completes the assembly and filling of the cartridge-needle unit which, on leaving the channel, is discharged into any suitable container.

*Description of a preferred embodiment*

The following more detailed description of a preferred embodiment of this invention is intended to be exemplary only and not to limit the invention, the scope of which is defined in the appended claims.

Referring to the drawings:

FIG. 2 is a plan view of the apparatus of FIG. 1;

FIG. 10 is another perspective of the filling disc with attached metering pumps again viewed generally crosswise of the views shown in FIGS. 1 and 2, but in this case in a direction generally from the front and right thereof as indicated by arrow J in FIG. 2, to show the relationship of the crimping unit to the filling station disc and the needle-assembly applying disc;

FIG. 11 is a perspective of the needle-assembly applying disc of FIG. 10, the view being taken generally crosswise in a direction from the front and left with respect to FIGS. 1 and 2, in the direction of arrow K in FIG. 2;

FIG. 14 is a perspective of a stop switch for the apparatus disclosed;

FIG. 15 is an exploded view of the nitrogen-flushing system therefor; and

FIG. 16 is a plan of the nitrogen-distributing fitting of FIG. 15 with part of the top removed to disclose the channels therein.

*General arrangement*

Figure 1:
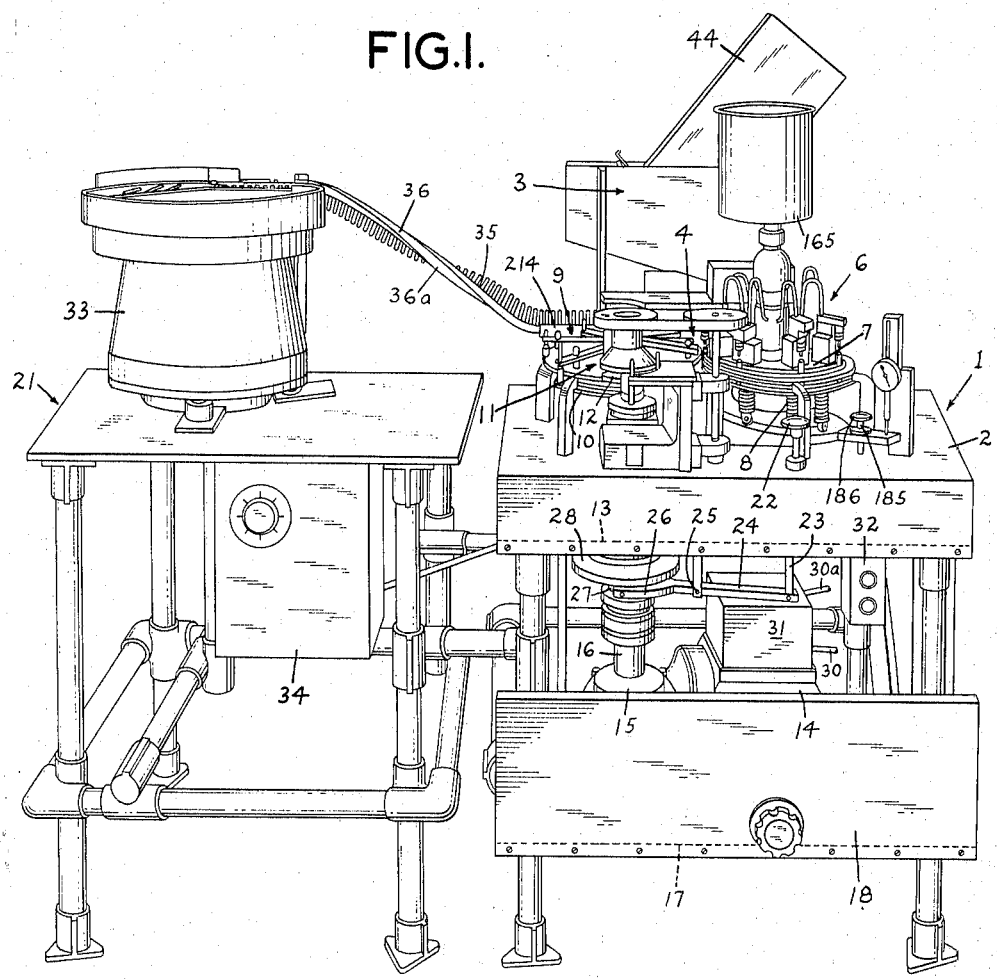
FIG. 1 is a front perspective view of apparatus according to this invention.

As will be seen in FIG. 1, the assembling and filling equipment is mounted on two adjacent tables 1 and 21 secured in fixed position on the floor.

On the top surface 2 of table 1 are supported a tube hopper 3, and alining station 4 comprising a first disc 5, a filling station 6 comprising a second disc 7 and pumps 8, a needle-hub assembly-applying station 9 comprising a third disc 10 and a crimping station 11 comprising a vertically disposed roller 12 together with accessory equipment as will appear hereinafter. Table 1 is also provided with a shelf 13 located beneath top surface 2 as indicated by a broken line in FIG. 1, and has mounted therebetween the synchronizing gears of the discs 5, 7 and 10 and of roller 12, which gears are seen uncovered and in plan in FIG. 5. Drive motor 14, adjustable reduction gear 15 and vertical drive shaft 16 are mounted on a lower shelf 17 (indicated in broken lines in FIG. 1) supported on front panel 18. Manual starting and stopping of the assembling and filling equipment is controlled by clutch 27 operated by knob 22 through rod 23, lever 24 pivoted at 25, and yoke 26. Hand wheel 28 is fixed on shaft 234 for inching the moving parts around in adjusting the machine. Electric power is furnished from mains 30 through service box 31, lead 30a and switch 32.

A conventional vibrating hopper 33 with electric control box 34 is mounted on table 21 and feeds alined needle-hub assemblies 35 down spiral chute 36 to the needle-hub assembly applying station 9. The spiral is introduced into the chute to erect the needle-hub assemblies from a pendant point-down position as received from hopper 33 to a point-up position as delivered to disc 10.

Figure 3:
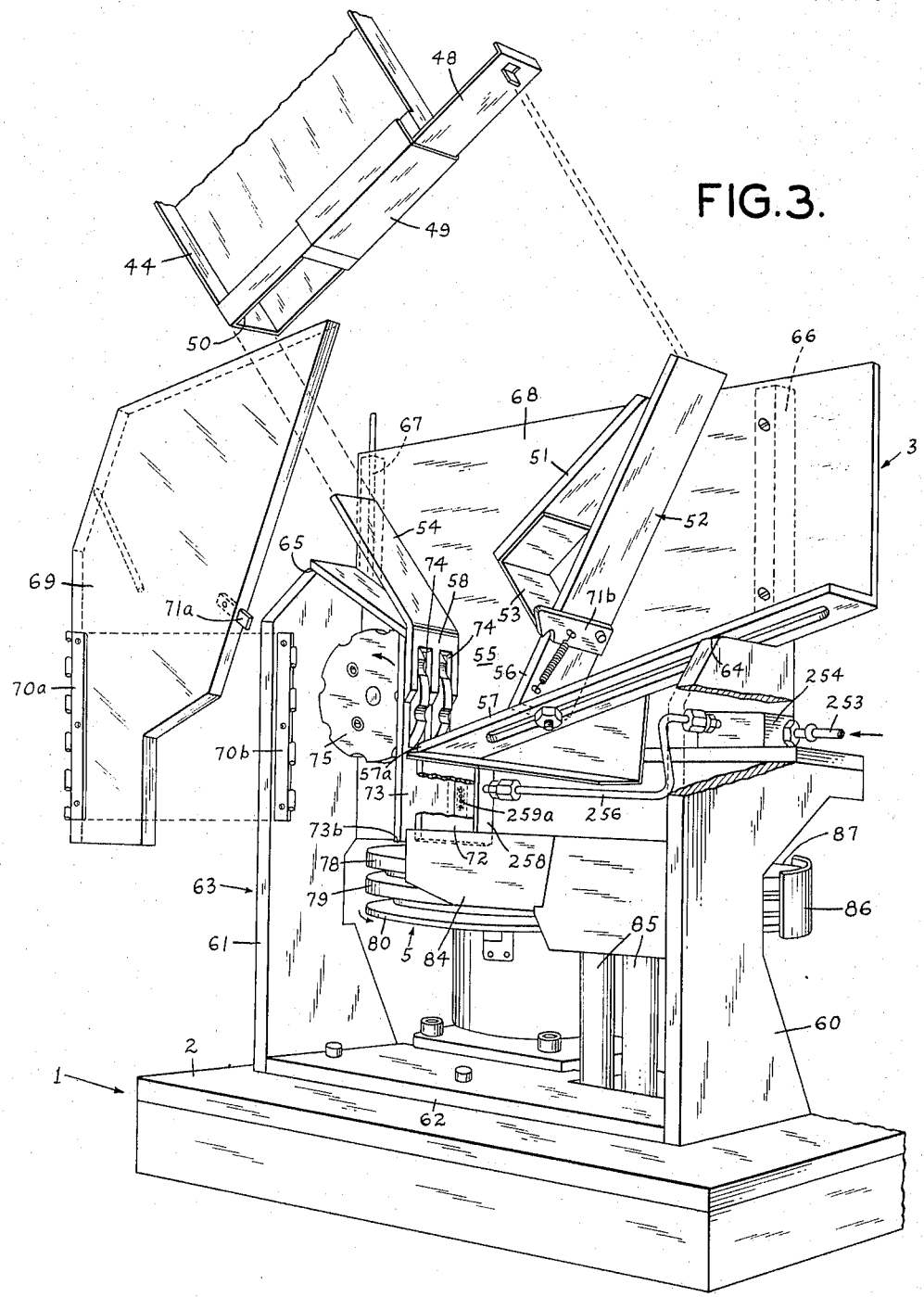
FIG. 3 is a rear perspective view of the tube-feed mechanism, shown enlarged with respect to the scale of FIGS. 1 and 2, and with the rear wall structure removed to disclose the interior structure of said mechanism.
Figure 4:
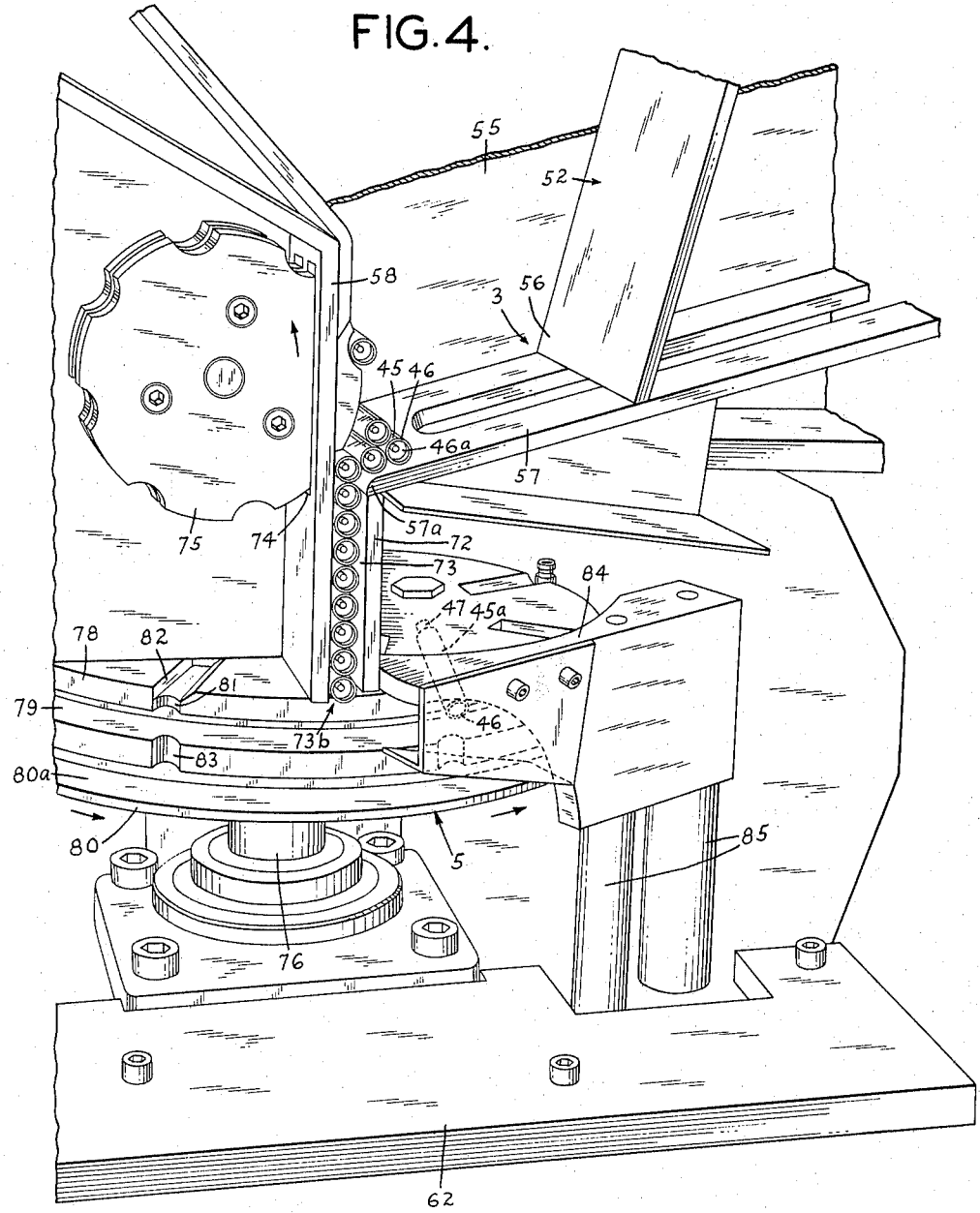
FIG. 4 is a perspective view of the tube hopper and alining disc of the tube-feed mechanism shown in FIG. 3 and further enlarged with respect to the scale of the latter.

The needle-hub assemblies are similar to those illustrated in FIGS. 3 and 4 of Dann Patent No. 2,671,450 for Injection Syringe and Cartridge, patented March 9, 1954.

The operation and structure of the apparatus can best be made clear by following the course of the glass tubes, the flowable drug, and the needle-hub assemblies through the machine.

Alining station

A tray 44 (FIG. 3) containing clean sterile tubes 45 in aligned orientation, with the ends 46 thereof containing the slidable plungers 46a facing outwardly and the opposite open outwardly flanged ends 47 facing inwardly, as viewed in FIGS. 3 and 4, is placed in hopper 3. Tray 44 has a hinged cover on the side towards the viewer (not shown for simplicity sake), and a sliding gate 48 in its lower end wall 49 which can be withdrawn as shown to expose an exit port 50 to permit the tubes 45 to flow by gravity into hopper 3.

FIG. 3 is a partially exploded view, showing tray 44 removed from its operative position in hopper 3 but with gate 48 withdrawn. In operative position, end wall 49 of tray 44 rests against an inclined false wall 51 maintained on wall 52 of hopper 3 by supporting wall 53. An inclined opposite wall 54 cooperates with false wall 51 for supporting tray 44 at an angle (FIG. 1) above a converging chute 55 (FIG. 3) formed by the lower end of 56 of wall 52, inclined bottom 57 of hopper 3 and vertical wall 58 disposed opposite inclined wall end 56 and extending downwardly from the lower edge of wall 54. As best seen in FIG. 4, bottom wall 57 terminates in a bevelled edge 57a short of engagemen with vertical wall 58 a distance substantially equal to the diameter of the tubes 45, for a purpose that will appear below. End walls 60 and 61 are rigidly secured to base plate 62 bolted to table top 2 to provide a supporting framework 63 for hopper 3 as by shoulders 64 and 65 and by narrow uprights 66 and 67 respectively extending upwardly therefrom and having sidewall 68 of hopper 3 affixed thereto. The side of hopper 3 opposite sidewall 68 is closed by a door 69 (shown in exploded relationship to the remaining structure of FIG. 3). Door 69 is preferably of a transparent material, and is swingably mounted by hinge structure 70a and 70b, and secured when closed by a spring-urged latch 71b engaging keeper 71a (mounted on door 69). This door structure permits observation during operation and ready access to the interior of the hopper 3.

The lower portion of wall 58 and a vertical extension 72 of floor member 57 from bevelled edge 57a thereof form therebetween a channel 73. Wall 58 is provided with two vertical slots 74 through which protrude the dual notched rims of unscrambling wheel 75. This wheel is rotatably mounted on a horizontal axis and is continuously driven in a counter-clockwise direction (FIGS. 3 and 4) by a right-angle gear train, not shown, taking power from shaft 76 above table 1 and above aligning disc 5 discussed hereinafter. The effect of this rotation of notched wheel 75 is to provide a gentle agitation of the tubes 45 descending by gravity into channel 73 while preserving parallel alignment, thus preventing cross-bridging and consequent interference with flow of said tubes 45. The lowermost edges of walls 58 and 72 terminate above the upper surface of disc 5 to provide a discharge slot 73b above said surface a distance a little less than the diameter of tubes 45 for a purpose that will now appear.

Aligning disc 5 is of composite construction, comprising three concentric discs 78, 79 and 80 rotated in fixed relation to each other by synchronizing gears (shown in FIGS. 5 and 6) by means of said shaft 76 projecting downwards through table top 1, and in the direction of the arrows (FIGS. 3 and 4). Upper disc 78 is provided at its periphery with a plurality of angularly spaced vertical notches 81 and associated radial troughs 82. The periphery of disc 79 is provided with a plurality of vertical notches 83 with each notch 83 being respectively immediately below a notch 81. Disc 80 has neither notches nor troughs for a purpose that will appear.

The troughs 82 are of such a size and so placed that, as disc 5 rotates, each trough 82 receives from channel 73 a single tube 45 with its plugged end 46 protruding beyond the edge of disc 78, and removes said tube 45 from said channel 73.

A fixed cam 84, supported on posts 85, intercepts the protruding end 46 of each tube 45 as it is carried in a trough 82 and upends the tube to a vertical position, plugged end 46 down. The upended tube stands in an alined pair of notches 81 and 83, the bottom end 46 resting on the upper surface 80a of disc 5. An arcuate apron 86 surrounds a portion of disc 5 just closely enough to retain tubes 45 in position in notches 81 and 83 as disc 5 rotates. In FIG. 4, a tube 45a, just previously rested in a trough 82, is shown just after making contact with cam 84 and beginning its upending just prior to being positioned vertically in an alined pair of notches 81 and 83.

Figure 7:
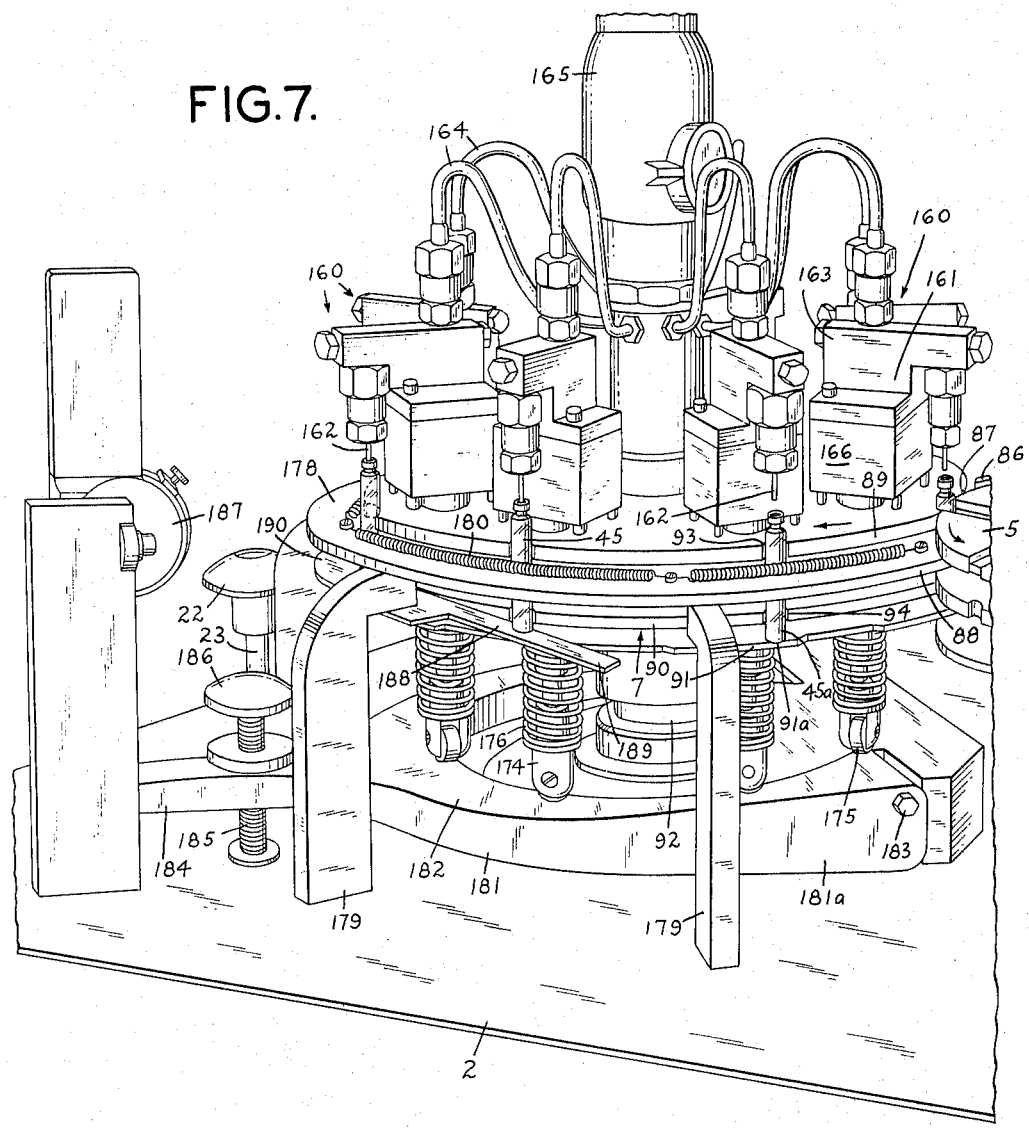
FIG. 7 is a perspective view of the filling disc and metering pumps seen in FIGS. 1 and 2, and enlarged with respect to the latter, the view being taken generally crosswise in a direction generally from the rear and right of the apparatus shown in said FIGS. 1 and 2 as indicated by the arrow G in FIG. 2.

The rotation of disc 5 in the direction indicated by said arrows (FIGS. 3 and 4) carries the erected tubes 45 to the point of near tangency 87 of discs 5 and 7 (FIG. 3). At this point a fixed diverting arm 88 sweeps each tube 45 in turn from disc 5 and transfers it to counter-rotating filling disc 7 (FIG. 7).

Tube-filling station

Figure 5:
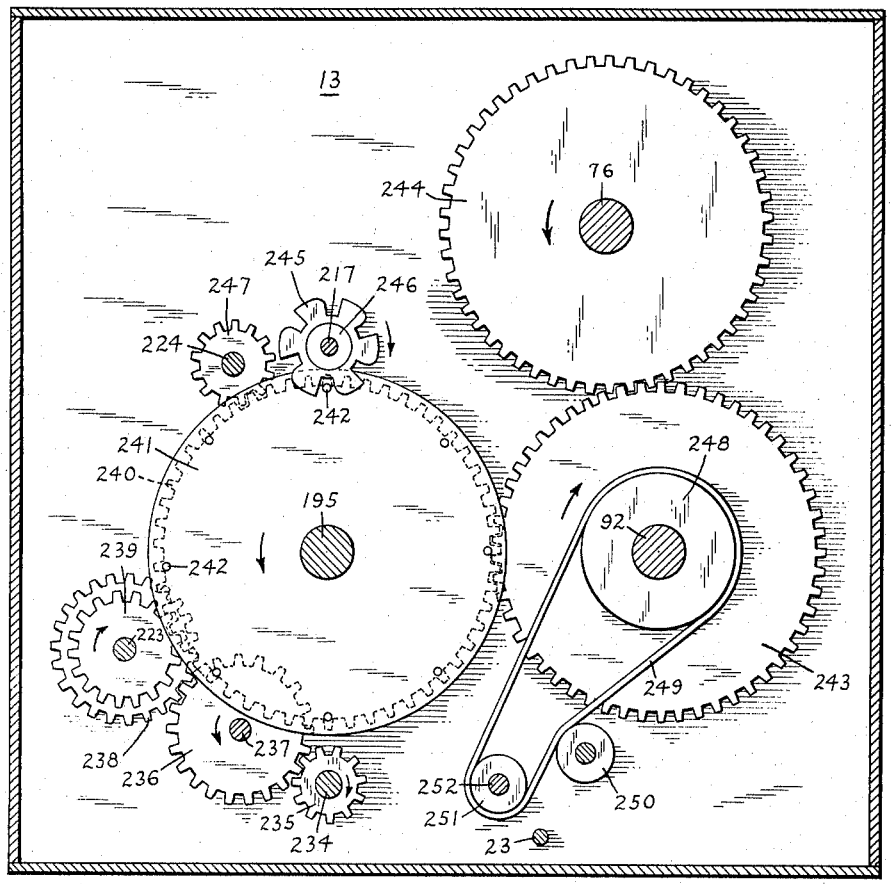
FIG. 5 is a plan view of the synchronizing driving gears of the apparatus of FIGS 1-4, shown schematically and also enlarged with respect to the scale of FIG. 2.
Figure 6:
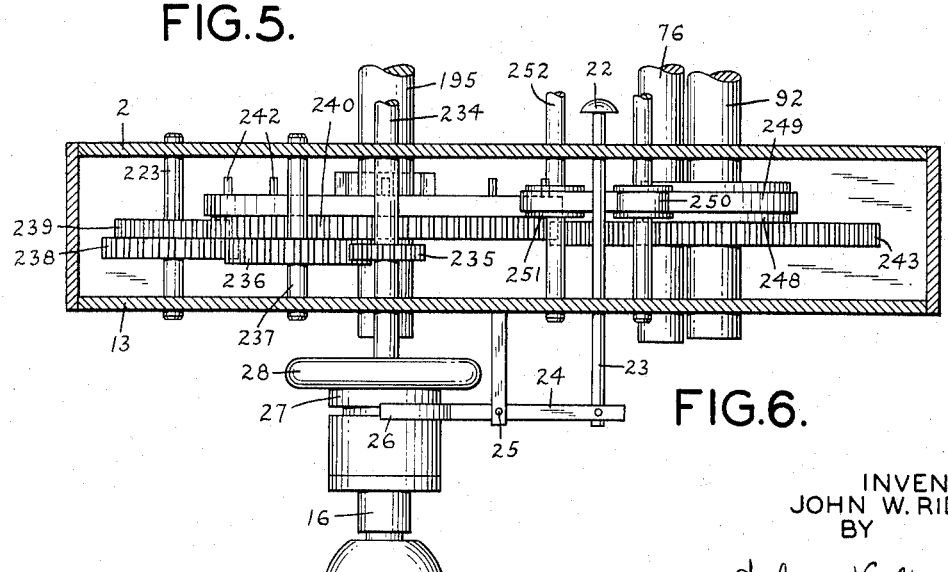
FIG. 6 is a front view of the gears of FIG. 5 and showing the mounting of said gears between the table top and the shelf therebelow.

Like disc 5, disc 7 is of composite construction, comprising three concentric discs 89, 90 and 91 rotated in fixed relation to each other by the synchronizing gears shown in FIGS. 5 and 6 by means of a vertical shaft 92 (FIGS. 5 and 7) projecting downward through table 1. Discs 89 and 90 are provided with angularly spaced and vertically alined peripheral notches 93 and 94 to receive the erected tubes 45 from disc 5. Tubes 45 rest on unnotched disc 91, the diameter of which is such that the bottoms 46 of the tubes slightly overhang the disc at 91a (FIG. 7).

Figure 8:
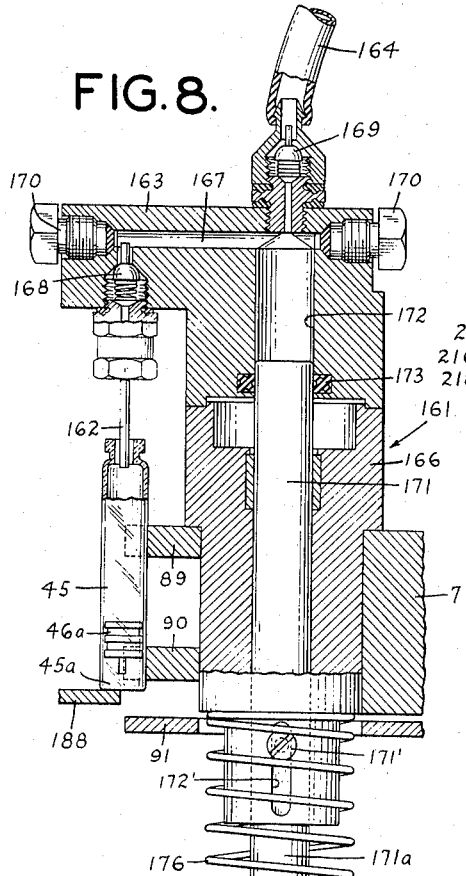
FIG. 8 is a further enlarged view, in vertical section, of one of the metering pumps appearing in FIG. 7.

Mounted on upper disc 89 is a circular array 160 of metering pumps 161 (eight are shown in the drawings), one above each pair of notches 93 and 94 and each having a delivery tube or filling needle 162 alined with a notch pair 93 and 94. The upper part of each pump 161 constitutes manifold 163 integral with the pump body and connected by a flexible inlet tube 164 with a bulk source 165 of injectable drug. The pumps 161 comprising housings 166 based on disc 7. As shown in FIG. 8, manifold portion 163 contains a duct 167 which communicates at one end with a one-way valve 168 in a passage leading to filling needle 162 and at the other with a one-way valve 169 in a passage leading to inlet tube 164. Clean-out plugs 170 are provided in conventional manner.

Each pump 161 is operated by a plunger 171 in bore 172 sliding in a gasket 173. The lower end of plunger 171 extends through disc 7 as a spring-biased push rod 171a terminating in a cam follower 174 provided with a roller 175. Compression spring 176, bearing at one end on the under surface of pump 161 and at the other on a flange 177 tends to keep the plunger 171 in a depressed position. A screw 171' is tapped into plunger 171 and passes with sliding fit in vertical slot 172'. This prevents rotation of the plunger assembly and inadvertent dropping out of plunger 171 when pump 161 is removed for servicing.

Disc 7 rotates within a fixed circular guard ring 178 mounted on brackets 179. A coil spring 180 is mounted on ring 178 so as to form a flexible polygon surrounding and exerting a gentle pressure on tubes 45 in notches 93 and 94 to retain tubes 45 in place during rotation of disc 7.

Under disc 7 is mounted a cam 181 having an upper surface 182 on which the cam follower rollers 175 ride. This cam is stirrup-shaped, the two arms 181a being pivoted on the fixed studs 183 at the ends of the arms on either side of disc 7. Intermediate the ends of the arms, cam 181 is extended in the form of a tongue 184 so arranged as to be adjustably raised or lowered by means of the micrometer screw 185 and knob 186. The position of cam 181 is indicated on micrometer dial 187.

Also mounted under disc 7 is a fixed arcuate guide 188 supported on brackets 179. Guide 188 follows closely the contour of disc 91 for a portion of a circular arc at such a distance from disc 91 as to intercept the overhanging bottoms 91a of tubes 45 resting on disc 91. The ends of guide 188 are depressed below the level of disc 91 as shown at 189 in FIG. 7 and the center portion is raised above this level as shown at 190.

From this description it will be obvious that, with tongue 184 adjusted to a suitably lowered position, as cam follower rollers 175 are carried along surface 182 of cam 181, pump plungers 171 will be lowered and then raised, thereby filling and then discharging pumps 161. At the same time, tubes 45 will be raised around the filling needles 62 of the pumps and then lowered after being filled by passage over guide 188. The raising and lowering of plungers 171 and tubes 45 is so synchronized that the last portion of the charge from pumps 161 is introduced into tubes 45 at a high level within the tubes while the tubes are partially lowered, thereby avoiding agitation and possible entrainment of air which might occur if the filling needle 162 were deep in a tube 45 as discharge from the needle is completed.

The micrometer adjustment 184–185–186 of cam 181 permits extremely close regulation of the length of travel of pump plungers 171 and hence extremely precise metering of the charge delivered to each tube 45.

As disc 7 rotates, it carries tubes 45 to a point of near tangency 191 with needle-hub assembly-applying counter-rotating disc 10; tubes 45 at this point having been filled and having been lowered by guide 188 clear of filling needles 162. At this point a fixed diverting arm (not visible) similar to arm 188 associated with discs 5 and 7 sweeps each tube 45 in turn from disc 7 to disc 10 (FIG. 10).

*Needle-hub assembly-applying station*

Disc 10 (FIG. 11) is like discs 5 and 7 in that it is also composite in structure, comprising two peripherally notched discs 192 and 193 and a bottom unnotched disc 194. It is rotated on a vertical shaft 195 projecting through table top 1. Disc 10 is surrounded by a fixed circular guard ring 198 (similar to guard ring 178) which is supported by brackets 196, and on the upper surface of which is fastened a polygonally contoured tube-retaining coil spring 197 similar to spring 180 and serving a similar purpose.

Corresponding to each peripheral notch 199 in disc 10, a radial bar 200 is mounted (eight are shown in the drawings) for vertical reciprocal parallel movement. The inner ends of the bars are formed with tangs 201 which slide in vertical guide slots 202 milled in a central boss 203 affixed to disc 10. Up and down movement of the bars is effected by push rods 204 (FIG. 12) rigidly bolted to bars 200. These rods 204 extend downwards with a sliding fit through apertures 10a in disc 10 and their lower ends 207 ride on a fixed cam whose surface is contoured to raise and lower bars 200 as described below. The push rods 204 are biased by compression springs 206 in a downward direction. The extent of downward travel of each of rods 204 is limited by a respective sleeve 204a on each rod 204 between the bar 200 associated therewith and disc 10.

For simplicity, showing of the cam is omitted as the arrangement is conventional and the operation is the same in principle as that of the plungers 171 of pumps 161 by cam 181 as illustrated in FIG. 7, with the exception that the cam under disc 10 is fixed, not adjustable.

The outer end of each bar 200 extends over a notch 199 and is provided with a notch 205 of a size to partially surround the rubber sheath 208 of a needle-hub assembly 35 but overlie the needle hub 209 thereof.

As pointed out above, the needle-hub assemblies 35 furnished for applying to and securing to tubes 45 comprise a hollow injection needle (not visible) fixedly mounted in a hub 209 and protected by a rubber sleeve 208. The hub 209 has a depending crimpable skirt 210 (FIG. 13a) adapted to be crimped around the flanged opening of a tube 45. Contained within hub 209 is an elastic closure (stopper or disc), not shown, which, after crimping, closes the tube 45 leak-tight.

These needle-hub assemblies 35 are placed helter-skelter in conventional vibrating hopper 33 by which they are fed to the slotted gravity chute 36 in uniform orientation with sheathed shafts 208 down, the sheathed shaft depending through the slot. The needle-hub assemblies 35 descend chute 36 by gravity, and by the vibratory action of hopper 33, and during descent they are erected to a point-up position by a 180° twist 36a in the chute (FIG. 1).

Chute 36 is continued at its lower end in a horizontal portion 214 supported on bracket 215 and ending adjacent a needle-hub assembly indexing wheel 216. This indexing wheel is intermittently rotated a fraction of a turn on vertical shaft 217 which passes down through table 1 to the synchronizing gears shown in FIGS. 5 and 6. A friction pulley (not shown) behind guide 221 and rotated by vertical shaft 224 (FIG. 5) urges the needle-hub assemblies 35 from the lower horizontal portion 214 of chute 36 towards indexing wheel 216. The cylindrical surface of wheel 216 is provided with elongated vertical needle-hub receiving grooves 218. As each groove 218 passes the bottom end 214 of chute 36, it picks up a needle-hub assembly and transfers it to a point of near tangency 219 with disc 10, the needle-hub assembly being retained in its slot by guide wall 220.

Figure 12:
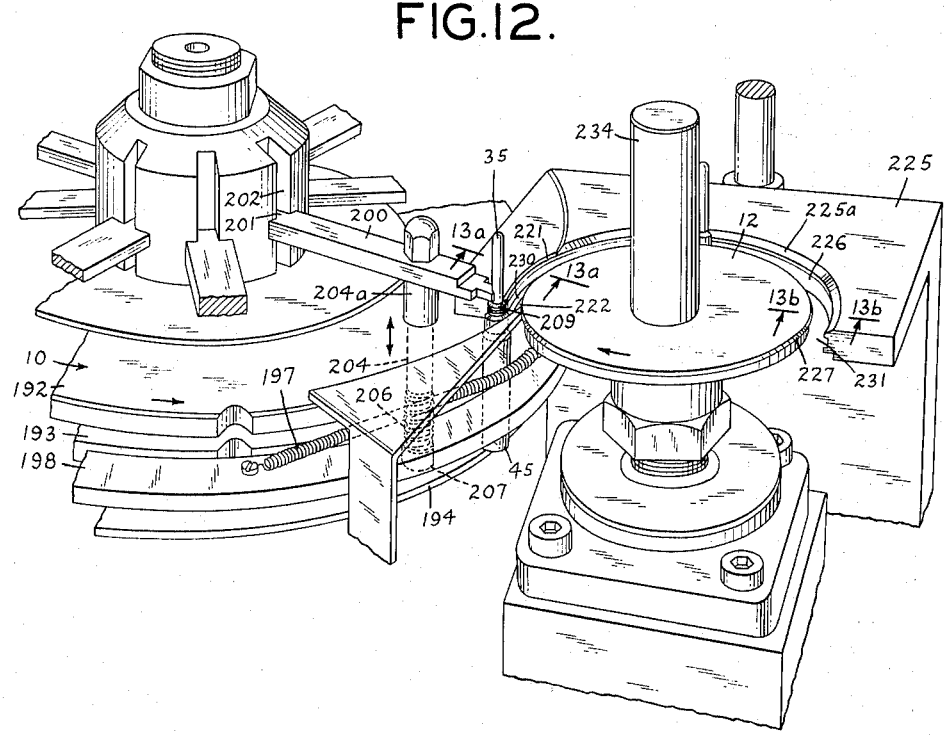
FIG. 12 is a fragmentary perspective of the crimping device, with parts thereof cut away for clarification of the structural relationships.

The intermittent rotation of index wheel 216 is so synchronized with the continuous rotation of disc 10 that a needle-hub assembly 35 is delivered to point 219 as a notch 199 on disc 10 containing a filled tube reaches this point. Here notch 205 in the end of a bar 200 engages the sheath 208 of a needle-hub assembly 35 and, in cooperation with guide wall 221a, sweeps the needle-hub assembly to a position directly over a filled tube. At the same time, the fixed cam under disc 10 on which push rods 204 ride, causes the lowering of the bar 200, thus positioning the needle-hub assembly on the filled tube and pressing the needle hub 209 of the assembly firmly on the flanged open end of the tube 45 (FIG. 12). As the tube with needle-hub assembly 35 thereon approaches the crimping station to a point of near tangency 222 with crimping roller 12 (FIG. 12) the bar 200 is raised, releasing the assembly to permit the crimping operation to occur as now described below.

Crimping station

As stated above, the filled tubes with needle-hub assemblies 35 in place are carried by the rotation of disc 10 to a point of near tangency 222 with crimping roller 12 (FIG. 12). Roller 12 is rotated in a clockwise direction as indicated by the arrow in FIG. 12 by means of a vertical shaft 234 extending down through table 1 to the synchronizing gears shown in FIGS. 5 and 6.

Figure 13A:
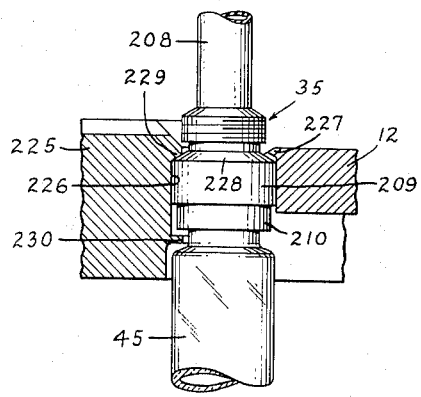
FIG. 13a is a vertical sectional view of the details of the crimping device, taken on line 13a—13a of FIG. 12, and showing the status of a hub on a glass tube before crimping.
Figure 13B:
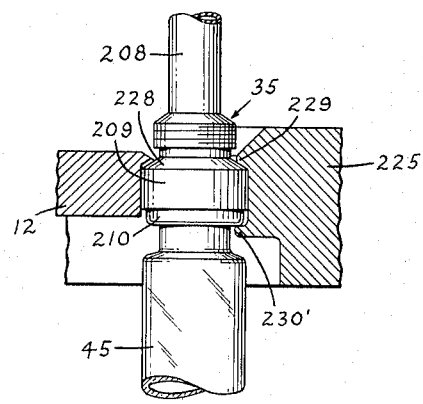
FIG. 13b is a second vertical sectional view of the details of the crimping device, taken on line 13b—13b of FIG. 12, and showing the status of a hub on a glass tube further along the crimping channel after crimping has occurred.

Crimping roller 12 rotates within the concentric curve 225a of an arcuate fixed plate 225 with which it forms an arcuate channel 226 of a width to receive the hub 209 of a needle assembly 35 in rolling engagement. The rim of the crimping roller 12 is formed with a slightly projecting flange 227 adapted to overlie the shoulder 228 of hub 209 as best seen in FIGS. 13a and 13b.

The edge of plate 225 forming the fixed wall of channel 226 is provided with two slightly projecting flanges 229 and 230, the upper one of which 229, like flange 227 overlies the shoulder 228 of hub 209. The lower flange 230 at the entrance to channel 226 is spaced from flange 229 a distance to permit hub 209 to enter channel 226 without contact with hub skirt 210 as seen in FIG. 13a, but approaches flange 229 towards the exit of the channel 226 to force skirt 210 inward and upward as seen in FIG. 13b at 230'.

Disc 12 is driven at a peripheral speed greater than that of disc 10 to effect a rolling motion of tube and needle assembly 35 along the edge of plate 225 in channel 226, but the speed of disc 12 is so regulated that the overall travel of each tube and needle assembly 35 in channel 226 is substantially the same as the peripheral velocity of disc 10, thus effecting a smooth low-inertia transfer from disc 10 to channel 226.

From this description it will be seen that the passage of the tube and needle assemblies 35 through channel 226 results in firmly crimping hub 209 on the flanged open end of tube 35 thereof. This action also presses the elastic closure (not visible) contained in hub 209 firmly on the flanged end of tube 45 to form a leak-proof joint.

The completed cartridges ejected from the end 231 of channel 226 are received in any suitable receptacle (not shown) for further handling such as packaging, etc.

The synchronized drive of discs 5, 7 and 10, and of indexing wheel 216 and crimping wheel 12 is effected by the gears illustrated in plan view in FIG. 5 and in front elevation in FIG. 6.

Power is transmitted from drive shaft 16 through clutch 27, when the latter is engaged, to shaft 234 journaled in shelf 13 and table top 2. Spur gear 235 fixed on shaft 234 drives spur gear 236 on similarly journaled shaft 237 which in turn drives gear 238 fixed on journaled shaft 223.

A second spur gear 239 fixed on shaft 223 smaller than and rotating with gear 238 meshes with and drives large toothed gear 240 fixed on shaft 195 to which disc 10 is affixed. Gear 240 also meshes with and drives gear 247 on shaft 224 which serves to rotate friction wheel (not seen) urging needle assemblies from chute 36 at 214. Mounted fixedly on gear 240 is pin plate 241 carrying equispaced pins 242 (eight are shown in FIG. 5). Gear 240 meshes with and drives a gear 243 of the same size affixed to shaft 92 on which disc 7 is mounted. Gear 243 in turn drives equisized gear 244 affixed to shaft 76 on which disc 5 is affixed.

Pins 242 on plate 241 engage teeth 245 on Geneva wheel 246 affixed to shaft 217, thus imparting an interrupted rotation to the latter.

In addition to the gear train described, means are provided for driving a clearing wheel described below among the accessory devices. These means comprise a pulley 248 affixed to shaft 92, a driving belt 249, an idler pulley 250 and a pulley 251 affixed to shaft 252 which rotates drive pulley 291 also affixed to shaft 252 (FIG. 10) as referred to hereinafter.

From the description of the gear train it will be seen that discs 5, 7 and 10 are constantly rotated at the same speed, the speed being regulated by the adjustable reduction gear 15. Needle-indexing wheel 216 will be intermittently rotated in synchronism with disc 10, and crimping wheel 12 will be rotated at a greater angular velocity than that of disc 10 as described above.

Accessory devices

Accessory devices may advantageously be used in conjunction with the basic machine disclosed above. These facilitate smooth and satisfactory operation although not essential to its fundamental purpose which is the filling and assembly of the cartridges described. Such devices comprise: A system for flushing open or exposed tubes with nitrogen or other inert sterile gas to help prevent oxidation of medicaments such as may occur if air is present in an assembly stored for a time before using, and/or to remove dust or other adventitious undesired matter; automatic means to stop the machine when a tube or needle-hub assembly is missing at the appropriate positions, thus avoiding waste of drug and needle-hub assemblies; and means to clear any jam occurring in the crimper passage 226.

Gas flushing

The gas-flushing system comprises (FIGS. 2, 3 and 15) a source of nitrogen or other gas 253 connected to a manifold 254 with which two delivery tubes 255 and 256 are connected. Manifold 254 is mounted adjacent hopper 3 on a suitable support as best seen in FIG. 3. Tube 255 leads to a distributing nozzle 257a for a cowl 157 having passageways 257b leading to an arcuate channel 257c provided with a bottom opening slot 257d arranged to flush the filled tubes 45 on disc 10 immediately before they receive the needle-hub assemblies from indexing wheel 216. Tube 256 leads to a box 258 provided with an outlet 259 and a cover plate 258a having a plurality of smaller apertures 259a for restricting flow from outlet 259 into a plurality of jets arranged to flush open unfilled tubes 45 as they are delivered from hopper 3 to alining disc 5 when box 258 is mounted adjacent passageway 73 (FIG. 3) by means of screws 259b.

No-tube automatic stops

A no-tube automatic stop switch 260 is located above and adjacent the rim of disc 5 as shown in FIG. 2 at a point where disc 5 has picked up a tube from hopper 3 but has not yet delivered it to disc 7. The construction of switch 260 is shown in FIG. 14.

Switch 260 comprises a base 261 fixedly mounted by screws 261a above and near the edge of disc 5 and an operating lever 262 pivoted at 263 on base 261. Lever 262 is biased by spring 264 to swing to the right in a generally clockwise direction as seen in FIG. 14 so that its arcuate edge 265 would overlie notches 81 in disc 78. The presence of a tube 45 in a notch 81 passing the switch would, however, prevent this outward swing of edge 265 and with it lever 262. The angular extent of edge 265 around the axis of disc 5 is just sufficient to span two successive notches 81 in disc 78.

A microswitch 267 mounted on base 261 has an operating button (not visible) positioned to be contacted by upstanding tab 266 of lever 262 when lever 262 is in the pushed-in position shown in FIG. 14. Lever 262 is maintained in this position against the bias of spring 264 by the pressure of tube 45 the upper part of which bears on edge 265. An adjustable stop screw 268 extends through base 261 to be abuttable by tab 266 so as to limit the inward travel of lever 262 against switch 267.

Microswitch 267 is so connected by conventional lines and relays with the main power source that, when lever 262 is swung to the right in the direction of the arrow, i.e., when a tube 45 is missing from an approaching notch 81 in disc 78, tab 266 operates the microswitch and the entire apparatus is stopped.

A suitable correction can then be made and the machine restarted. This action prevents waste of drug and fouling of the machine by ejection of drug from a metering pump into an empty tube position on disc 7 (i.e., a position unsupplied by disc 5).

An additional no-tube automatic stop arrangement may be employed in connection with the needle-indexing wheel and the needle-applying disc, the purpose being to eliminate wastage of a needle-hub assembly when no tube is presented to receive it.

Such an arrangement may comprise a no-tube switch identical with switch 260 but mounted above and adjacent the edge of disc 10 at an appropriate point between the point of near tangency 191 where disc 10 normally receives tubes 45 from disc 7 and the point of delivery of needle-hub assemblies from indexing wheel 216.

Figure 9A:
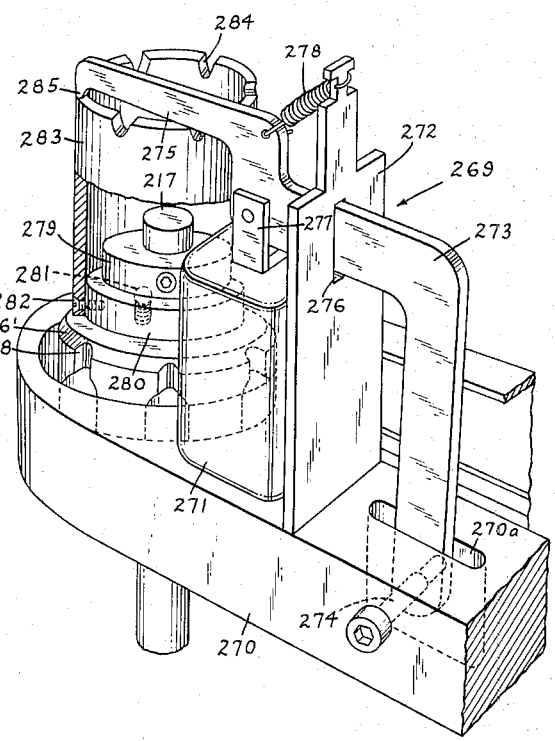
FIG. 9a is a perspective of a safety stop mechanism for the needle-hub assembly-applying means shown in FIG. 2.

This switch is so connected as to send an electric impulse to stop device 269 illustrated in FIG. 9a rather than to stop the entire machine. This device comprises a rigidly mounted base 270, one end of which partially surrounds the upper part of indexing wheel 216 and on which are mounted a pull solenoid 271 and an upstanding guide plate 272. A right-angled stop lever 273 is pivoted at 274 in a slot 270a in base 270, the horizontal arm 275 of lever 273 extending through slot 276 of guide plate 272. An armature 277 pivotally connected to arm 275 of lever 273 is suspended in the coil (not visible) of solenoid 271. Tension spring 278 biases arm 275 in an upward direction.

Index wheel 216' is similar to wheel 216 and is driven by shaft 217. The drive is through two collars, collar 279 affixed to shaft 217, and collar 280 affixed to wheel 216'. Driving friction between the collars is maintained by spring-loaded ball 281 retained in a recess in collar 280 and bearing on indexed indents (not visible) in the under side of collar 279.

Fixedly mounted on wheel 216', by means of screws 282 engaging collar 280, is vertical cylindrical tube 283 having radial notches 284 in its top edge corresponding to grooves 218 and adapted to mate with a hook 285 on the end of arm 275 when the latter is depressed.

When the above mentioned no-tube switch associated with disc 10 sends an electric pulse to solenoid 271 due to the absence of a tube on disc 10 in the expected location, it will be seen that hook 285 will be depressed, engage a notch 284 in cylinder 283 and thus arrest further rotation of index wheel 216', while shaft 217 will not be arrested. Thus no needle-hub assembly will be delivered to the vacant position on disc 10.

When a properly filled notch on disc 10 then arrives at the no-tube switch, solenoid 271 will be de-energized and the needle-hub assembly operation will resume owing to the retraction of lever arm 275 by spring 278 and consequent release of the braking effect on cylinder 283 and indexing wheel 216'.

Figure 9B:
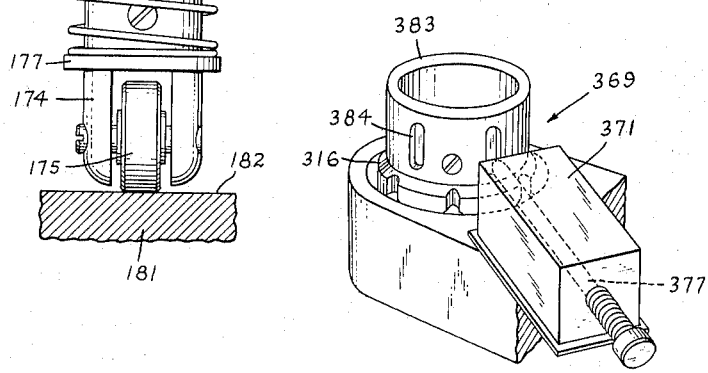
FIG. 9b is a perspective of an alternative form of safety stop mechanism for said means.

A modification 369 of the stop device 269 is shown in FIG. 9b. Here a pushing solenoid 371 is arranged so that when it is energized, the end of its armature 377 is projected into a groove 384 in cylinder 383 affixed to indexing wheel 316, thus arresting the rotation of the latter which is frictionally driven as in FIG. 9a.

*Jam-clearing wheel*

It is possible that from time to time a defective cartridge passing through the crimping channel 226 may deviate slightly from the vertical. If this is not corrected a jam may occur, interrupting the continuity of the crimping and discharge operations. To obviate this a clearing wheel 286 is mounted freely rotatable on the upper end of shaft 223 which drives the crimping roller 12. Clearing wheel 286 has a lower portion 287 from which depend angularly equispaced blades 288 reaching a short distance into and rotating in channel 226. The upper portion 289 of the clearing wheel constitutes a pulley which is driven by a rubber-fabric timing belt 290. This belt in turn is driven by pulley 291 affixed to shaft 234.

Clearing wheel 286 is driven at such a speed (less than that of crimping roller 12) that blades 288 rotate in channel 226 at substantially the speed with which the completed cartridges pass through the channel. Blades 288 thus follow behind the cartridges through the channel, but if a cartridge lags or leans, a blade 288 effectively causes correction of the difficulty by bearing on the offending cartridge and thus prevents it from engaging the next cartridge behind it. Avoidance of jamming of cartridges in the crimping station is thus accomplished.

From the foregoing disclosure it will be seen that there has been devised a new, practical, rapidly operating apparatus for filling and assembling cartridge-needle units, and novel accessory mechanisms for use therewith. As will readily appear to those skilled in the art, many changes and modifications may be made in said apparatus and accessory mechanisms without departing from the spirit of the invention as appears from this specification and the scope thereof as set forth in the appended claims.

I claim:
1. In a machine for assembling and filling injection cartridges, in combination:
   (A) an alining station, a filling station, a needle-hub assembly-applying station and a crimping station;
   (B) means for transporting vertically alined partially completed cartridges continuously to and through said stations, said means comprising a separate horizontal disc for each of said alining station, said filling station and said needle-hub assembly-applying station;
   (C) said horizontal discs being of the same diameter and rotatably mounted with a first point of near tangency between said disc of said alining station and said disc of said filling station and a second point of near tangency between said disc of said filling station and said disc of said needle-hub assembly-applying station;
   (D) common driving means operatively associated with said three horizontal discs for driving each of the latter at the same peripheral speed, said common driving means comprising three shafts, on a respective one of which each of said discs is respectively mounted for rotation therewith, and three equisized gears, each of which is mounted on a respective one of said shafts for rotation therewith and drivingly engaged directly with one other of said gears at the location of near tangency of said same diameter discs.

2. The combination defined in claim 1 in which the crimping station comprises a horizontal disc of smaller diameter rotatably mounted with a point of near tangency between said disc of smaller diameter and said disc of said needle-hub assembly-applying station.

3. The combination defined in claim 2 in which said common driving means also comprise gearing operatively associated with said horizontal crimping disc of smaller diameter for driving the latter disc at a peripheral speed greater than the peripheral speed of said three equisized discs in a direction opposite that of said disc of said needle-hub assembly-applying station.

4. The combination defined in claim 1 in which sensing means are provided adjacent the periphery of said disc of said alining station for sensing whether a cartridge is being carried past said sensing means, said sensing means being responsive to render said common driving means inoperative when a cartridge is not being carried past said sensing means.

5. In a machine for assembling and filling injection cartridges in which the partially completed injection cartridges are continuously moved through a plurality of operating stations, in combination:
   (1) an alining station comprising a horizontally disposed rotatable disc, a plurality of radially disposed grooves in the upper surface of said disc, means for rotating said disc continuously, each of said grooves opening out at the periphery of said disc and being dimensioned and adapted to receive and convey in horizontal attitude a single tube element of the cartridges to be assembled and filled by said machine, a plurality of vertical notches in the periphery of said disc, each of said notches being in communication with a respective one of said grooves at the peripheral end of the latter and being dimensioned and adapted to receive a single tube element in vertical attitude;

(2) hopper means for supplying horizontally disposed tube elements singly to said radially disposed grooves in said disc as said disc is continuously rotated, with the ends of the tubes extending out beyond the peripheral ends of said radially disposed grooves and overlying the vertically disposed grooves associated therewith, and (3) camming surface means adjacent the periphery of said disc for abutting the extending end of a horizontally disposed tube in one of said radially disposed grooves as said disc continuously rotates away from said hopper means and for causing pivoting of the tube downwardly at its extending end and into the one of said vertically disposed grooves in communication with said one of said radially disposed grooves.

6. In a machine for assembling and filling injection cartridges in which partially completed injection cartridges are continuously moved through a plurality of operating stations, a filling station comprising:

(A) a rotating disc having tube-retaining means in its periphery;

(B) said tube-retaining means comprising lower support means which maintain the tube supported thereby with a portion of the bottom area of the tubes protruding outwardly beyond said support means;

(C) a circular array of pumps mounted on and rotating with said disc, one for each retaining means;

(D) a source of injectable drug connected with the inlet of each pump and an outlet from each pump centered over each tube-retaining means;

(E) cam means for causing the operation of each pump in turn by rotation of said disc, said cam means comprising a separate cam follower operatively connected to each of said pumps, respectively, a common continuous cam surface on which said cam followers ride, and means for adjusting said cam surface angularly with respective said cam followers; and (F) a stationary guide surface supported adjacent said disc for engaging the protruding bottom area of the tubes as they are moved therepast, said guide surface being curved upwardly and downwardly to cause lifting and then lowering of the tubes as they are moved laterally by said disc as said pumps are caused to operate by said cam means.

7. In a machine for assembling and filling injection cartridges as claimed in claim 6, wherein the curve of said guide surface and the contour of said cam surface are so correlated to cause raising of a given tube during charging of the one of said pumps operatively associated therewith and lowering of the tube as said pump is caused to discharge into the tube.

8. In a machine for assembling and filling injection cartridges in which partially completed injection cartridges are continuously moved through a plurality of operating stations, in combination:

(1) a crimping station, said crimping station comprising a horizontally disposed rotatable crimping wheel and a fixed plate having an arcuate recess within which said wheel rotates, the edge of the arcuate recess being opposed to and so spaced from the rim of the wheel as to form a channel extending in an arc which is at least the major portion of a semi-circle and adapted to receive in rolling engagement the hubs of the needle-hub assemblies mounted on the ends of the cartridges, the edge of the recess and the rim of said wheel being so contoured as to crimp, around the ends of the cartridges, the crimpable skirts of the hubs of needle-hub assemblies passing through said channel;

(2) feeding means for said crimping station, said feeding means comprising a horizontally disposed rotatable disc comprising peripheral cartridge supporting means which move in a path of near tangency with the periphery of said wheel; and (3) driving means for rotating said wheel and said disc whereby their adjacent peripheries move in the same direction and with the peripheral speed of said wheel greater than that of said disc.

9. The combination claimed in claim 8 wherein clearing means are provided for said crimping station, said clearing means comprising mounting means supported for rotation about the same axis as said wheel, a plurality of angularly equispaced blades fixed to said rotatable mounting means for rotation therewith with said blades moving laterally through said channel, and means for rotating said mounting means at a speed whereby said blades move laterally through said channel substantially at the speed at which the hubs of said needle-hub assemblies pass therethrough due to rotation of said wheel.

10. A machine for assembling and filling injection cartridges in which partially completed injection cartridges are continuously moved through a series of stations, said machine comprising an alining station, a filling station, a needle-hub assembly-applying station and a crimping station; said first three stations each comprising a horizontal disc of the same diameter rotatably mounted with a first point of near tangency between the first and second of said three discs and the second and third of said three discs, three equisized intermeshed gear wheels respectively fixedly associated axially with the three discs whereby the three discs may be rotated in alternating senses, equispaced tube-receiving notches in the periphery of each disc, the three intermeshed gear wheels being so proportioned as to bring a tube-receiving notch in each disc to a point of near tangency simultaneously with a notch in an adjacent disc, resilient tube-retaining means partially surrounding each disc, tube-diverting guides at each of the points of near tangency arranged to transfer tubes successively from disc to disc; a circular array of metering pumps mounted on the filling disc, one pump for each tube-receiving notch, each pump being connected with a source of an injectable drug and having a delivery tube alined over a tube-receiving notch in the periphery of the disc, a non-rotating cam mounted below the filling disc, a pump plunger, means connected with and projecting downwards beneath each pump plunger through the filling disc and riding on the cam, the surface of the cam being so formed as to cause vertical reciprocation of said means and with it the pump plungers as the filling disc revolves, whereby to alternately fill each pump with injectable drug and discharge the drug into a tube; an array of radial needle-applying bars mounted on and revolving with the needle-applying disc, the bars being arranged for parallel vertical reciprocation by means of affixed push rods slideably projecting downwards through the disc, a fixed cam below the disc on which the said push rods ride, means urging said push rods downwardly toward said cam, a source of needle-hub assemblies each comprising an injection needle fixedly mounted in a hub with a crimpable skirt, means to transfer a needle-hub assembly hub down, to a position above each filled tube in turn as the needle-hub assembly-applying disc rotates, means on the outer end of each of said radial bars to engage a needle-hub assembly above its hub and push down on said hub, said fixed cam being arranged to permit said urging means to depress each push rod and with it its associated radial bar after engaging a needle-hub assembly, thereby pressing each needle-hub assembly in position on a filled tube; said crimping station comprises a crimping wheel rotating in near tangency to the needle-hub assembly-applying disc at a point in the travel of the latter at which it carries tubes with applied needle-hub assemblies, a fixed plate having an arcuate recess within which the crimping wheel rotates, the edge of the arcuate recess being opposed to and so spaced from the rim of the crimping wheel as to form a channel extending in an arc which is at least the major portion of a semicircle and adapted to receive needle hubs in rolling engagement, the edge of the recess and the rim of the crimping wheel being so contoured as to crimp the crimpable skirts of needle hubs passing through the channel around the ends of the tubes; and a power source for rotating said discs at the same angular velocity and said crimping wheel at an angular velocity greater than that of the said discs.

11. In a machine for assembling and filling injection cartridges in which partially completed injection cartridges are continuously moved through a plurality of operating stations, a needle-hub assembly-applying station comprising:
(A) a rotating disc having tube-retaining means in its periphery;
(B) an array of radial needle-hub assembly-applying bars mounted on and rotating with said disc, one bar for each tube-retaining means, and cam means for causing vertical parallel reciprocation of said bars by rotation of said disc;
(C) indexing means for intermittently feeding needle-hub assemblies above each tube-retaining means in the periphery of said disc as said disc rotates continuously; and
(D) sensing means adjacent the periphery of said disc of said needle-hub assembly-applying stations for sensing whether a cartridge is being carried past said sensing means, said sensing means being responsive to render said intermittently operating indexing means inoperative when a cartridge is not being carried past said sensing means.

References Cited by the Examiner

UNITED STATES PATENTS

| | | | |
|---|---|---|---|
| 2,729,377 | 1/1956 | O'Neil | 53—281 XR |
| 2,841,937 | 7/1958 | Miskel et al. | 53—276 |
| 2,899,789 | 8/1959 | Smith | 53—281 |
| 2,902,809 | 9/1959 | Wysocki | 53—329 |

FOREIGN PATENTS 831,708   6/1938   France.

TRAVIS S. McGEHEE, *Primary Examiner.*

A. E. FOURNIER, *Assistant Examiner.*